UNITED STATES PATENT OFFICE.

WILLIAM V. CARTER, OF ASTOR, FLORIDA, ASSIGNOR TO THE PALMETTO COMPANY, OF PHILADELPHIA, PENNSYLVANIA.

ADHESIVE COMPOSITION AND METHOD OF MAKING SAME.

SPECIFICATION forming part of Letters Patent No. 660,144, dated October 23, 1900.

Application filed March 23, 1899. Serial No. 710,175. (No specimens.)

*To all whom it may concern:*

Be it known that I, WILLIAM V. CARTER, a citizen of the United States, residing at Astor, Lake county, Florida, have invented certain new and useful Improvements in Vegetable Glue and Methods of Making Same, of which the following is a specification.

The glue of my invention is extracted from palmetto-roots, which are very abundant and are not only to a large extent waste articles, but also by their presence ruin the land for agricultural purposes. The glue itself is soluble in cold water, will keep well, and is an excellent substitute for such ordinary glues and sizes as are used in the arts. It can be obtained in the form of jelly, or it may be diluted so as to make it more or less fluid. The roots contain pectous compounds, and these are the adhesive principle of the described glue. In their natural state the roots contain pectose and glucosides and probably other vegetable substances. Under the influence of comparatively high temperature and moisture a sort of fermentation ensues which changes the pectose into pectine or into some form of pectose which is soluble in water even when cold, and can therefore be diluted, and which is capable of being evaporated to a gelatinous condition.

To carry out my process, small pieces of palmetto-root are subjected to the action of moisture and of a considerable degree of heat. For example, they may be treated with superheated steam of, for example, 240° Farenheit for from seven to nine hours. The agglutinant is then extracted from the mass so treated by leaching it, or, in other words, repeatedly washing it with water. The solution or mother-liquor thus obtained from the leaching process is of approximately 3° Baumé, and it may be concentrated by evaporation to about 9° to 12° Baumé.

What I claim as new, and desire to secure by Letters Patent, is—

1. A vegetable glue consisting principally of soluble pectose material obtained from palmetto-roots, substantially as described.

2. The process of making glue which consists in treating palmetto-roots with moisture and heat to bring about a chemical reaction which forms a soluble glue and then leaching out the glue from the mass by washing with water, substantially as described.

In testimony whereof I have hereunto signed my name.

W. V. CARTER.

In presence of—
N. HARPER,
F. A. OWEN.